United States Patent [19]

Sugihara et al.

[11] Patent Number: 4,729,240

[45] Date of Patent: Mar. 8, 1988

[54] OPTICAL PRESSURE SENSOR

[75] Inventors: Takashi Sugihara, Nara; Masaya Hijikigawa, Yamatokoriyama, both of Japan

[73] Assignee: Sharp Kabushiki Kaisha, Osaka, Japan

[21] Appl. No.: 839,731

[22] Filed: Mar. 14, 1986

[30] Foreign Application Priority Data

Mar. 15, 1985 [JP] Japan .................. 60-52607

[51] Int. Cl.$^4$ .............................................. G01L 9/00
[52] U.S. Cl. ......................................... 73/705; 73/800
[58] Field of Search .................. 73/800, 705, 655; 250/231 P, 231 R, 227; 350/96.12, 96.29

[56] References Cited

U.S. PATENT DOCUMENTS

| | | | |
|---|---|---|---|
| 4,163,397 | 8/1979 | Harmer | 73/800 |
| 4,235,113 | 11/1980 | Larome | 73/655 |
| 4,295,738 | 10/1981 | Meltz et al. | 73/800 |
| 4,375,680 | 3/1983 | Cahill et al. | 73/655 |
| 4,451,730 | 5/1984 | Brogardh et al. | 73/800 |
| 4,495,819 | 1/1985 | Tekippe | 73/800 |
| 4,626,680 | 12/1986 | Martens et al. | 73/705 |
| 4,634,858 | 1/1987 | Gerdt | 73/705 |
| 4,688,883 | 8/1987 | Blaha | 350/96.29 |

FOREIGN PATENT DOCUMENTS 2480433 10/1981 France .

OTHER PUBLICATIONS

Naumann et al, *Taschenbuch fur Konstrukteure*, "Optik fur Konstrukteure", 1983, pp. 529-547, No Translation.

*Primary Examiner*—Stewart J. Levy
*Assistant Examiner*—Robert R. Raevis
*Attorney, Agent, or Firm*—Birch, Stewart, Kolasch, & Birch

[57] ABSTRACT

A pressure sensor element includes a polymer optical conductor which includes a substrate, a first organic polymer film formed on the substrate, a second organic polymer film superposed on the first organic polymer film, and an optical reflecting film provided on a patterned end face of the first organic polymer film. The first organic polymer film portion within the pattern has a refractive index different from that of the substrate. The first organic polymer film portion outside the pattern has substantially the same refractive index as the substrate. The refractive index of the second organic polymer film is substantially the same as that of the first organic polymer film portion outside the pattern. At least either one of the refractive indexes of the first and second organic polymer films changes with pressure fluctuation.

17 Claims, 2 Drawing Figures

OPTICAL PRESSURE SENSOR

BACKGROUND OF THE INVENTION

The present invention relates to a pressure sensor, or more specifically to an optical pressure sensor (pressure sensor element) which measures pressure applied from the exterior by detecting the intensity fluctuation of the light transmitted through a polymer optical conductor.

The resistance strain gauge and the semiconductor pressure sensor are conventional and well known in the art as pressure sensors. These sensors convert the detected pressure into an electrical signal. Therefore, if the detector is located in an environment near a copying machine or a like high potential source, in a vehicle with extreme temperature variation or in water, the electromagnetic atmosphere can cause noise in the signal, or the ionic atmosphere can lead to corrosion. Besides, if the sensor is installed in a combustible atmosphere, electrical spark may cause fir or an explosion.

In view of the foregoing, there is proposed an optical pressure sensing system as an improved pressure detection system with a good resistance to the environment, free from electromagnetic noise influence and explosion or fire possibility, while capable of detecting signals from the remote sensor element through an optical fiber.

There are a number of different types of optical pressure sensors: a switch type sensor which mechanically blocks the light path according to the pressure; a sensor which uses the photoelastic effect in detecting the light intensity fluctuation due to the pressure variation; and a sensor which uses the acoustic optical effect in detecting vibration. For any of these types, if the sensor is to detect the light intensity using the plane of polarization of the light, it involves not only a sensing substance but also a polarizer, an analyzer, a polarized beam splitter, a λ/4 wavelength plate and a rod lens for connection between the sensor element and the optical fiber, and it is difficult to assembly these optical components into a compact sensor. In addition, the necessity of fixing the optical components with the sensing substance makes batch-processing of the sensor element difficult. Besides, considerable expertise is required in the above fixing operation. As a result, the sensor element production requires an extremely high cost.

There is another type of sensor that measures pressure fluctuation by detecting light intensity change due to interference. An example of this type is a Michelson interferometer of a Mach-Zehnder interferometer in which an inorganic photo conductor made of $LiNbO_3$ is used as a sensor element. Using the optical conductor, this type of sensor involves a reduced number of optical components, and the sensor element can be batch-processed. On the other hand, however, this sensor has the following disadvantage: since the sensor detects pressure based on the interference, it must use monochromatic light as the detection signal. Accordingly, it is necessary to use single-mode optical fiber for transmitting detection signals, though low loss connection between the sensor element and the single-mode optical fiber is quite difficult. Another possible pressure sensor involves a sensor element having a hollow structure composed of mica connected to the single-mode optical fiber end, so that the wall-to-wall distance variation of the hollow structure due to the pressure fluctuation is detected the form of the reflected or transmitted light intensity change due to Fabry-Perot interference. This type of pressure sensor has an advantage in that it can be made into a compact or probe construction. However, it is disadvantageous in that the sensor element has no compatibility and reproducibility in production: a hollow sensor element with wall-to-wall distance of wavelength magnitude is difficult to produce with good reproducibility.

SUMMARY OF THE INVENTION

Accordingly, it is an object of the present invention to provide an optical pressure sensor which is manufactured at a low cost and capable of measuring pressure fluctuation with high accuracy.

Other objects and further scope of applicability of the present invention will become apparent from the detailed description given hereinafter. It should be understood, however, that the detailed description and specific examples, while indicating preferred embodiments of the invention, are given by way of illustration only; various changes and modifications within the spirit and scope of the invention will become apparent to those skilled in the art from this detailed description.

To accomplish the above object, the present invention includes a high polymer optical conductor composed of a core layer and a clad layer as a sensor element. At least either the core or clad layer is made of an organic polymer material whose refractive index changes with pressure, whereby the pressure is detected on the basis of the intensity fluctuation of the light transmitted through the optical conductor. Multi-mode optical fiber is used for light transmission to and from the sensor element. Compared with a single-mode optical fiber, the multimode optical fiber is large in diameter and matches the core diameter of the polymer optical conductor. Therefore, the optical fiber can be connected to the sensor element easily and with low loss. Moreover, the light from the light source is divided into two portions, according to a specified wavelength range, by a filter provided on the sensor element end on which the light is incident. One of the two portions is reflected by the filter to become a reference signal, the other being allowed to pass the filter for transmission through the sensor element to become a detection signal whose light intensity has been changed. The detection signal-to-reference signal ratio is calculated and outputted from the sensor. The sensor, based on the above principle, can detect pressure with good accuracy, without influence by the light intensity fluctuation of the light source itself and without transmission loss due to bent optical fiber or other disturbance.

As mentioned above, a pressure sensor according to the present invention has the following advantages:

(1) The pressure sensor, which optically detects pressure, is superior in electromagnetic induction resistance and environmental resistance.

(2) The pressure sensor which uses optical fiber as the transmission medium can detect pressure from a remote location.

(3) An optical conductor is used as a sensor element, which is advantageous in manufacturing a thin film or compact sensor element.

(4) Although the sensor detects light intensity fluctuation, the number of optical components involved is substantially reduced.

(5) Since the sensor detects the change in the total reflection condition of the transmitted light (critical angle of the transmitted light mode) which is susceptible to the pressure variation, highly sensitive detection can be achieved. Measurement of low pressure is particularly accurate because the light intensity of the detection signal is very high in the low pressure range.

(6) Highly accurate detection can be achieved because the signal output from the sensor is the differential between the detection signal and the reference signal.

(7) The use of a multi-mode optical fiber as the transmission medium has realized a low loss connection with the sensor element.

(8) Since the sensor element can be manufactured by the existing patternization technique such as photolithography, it can be batch-processed and made compatible In addition to the above advantages, the optical pressure sensor of the present invention can be manufactured at a low cost due to the advantages of the items (3) and (4).

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
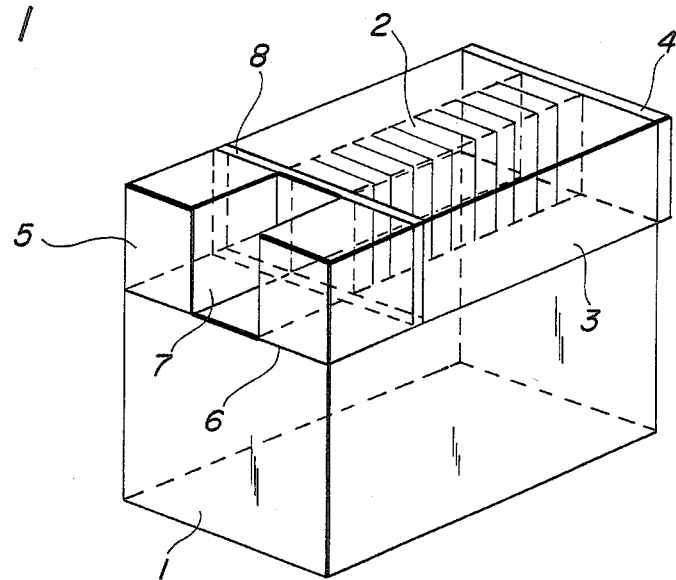
FIG. 1 is a structural model drawing showing an embodiment of a high polymer optical conductor pressure sensor of the present invention before the upper clad layer is connected with the optical fiber.
Figure 2:
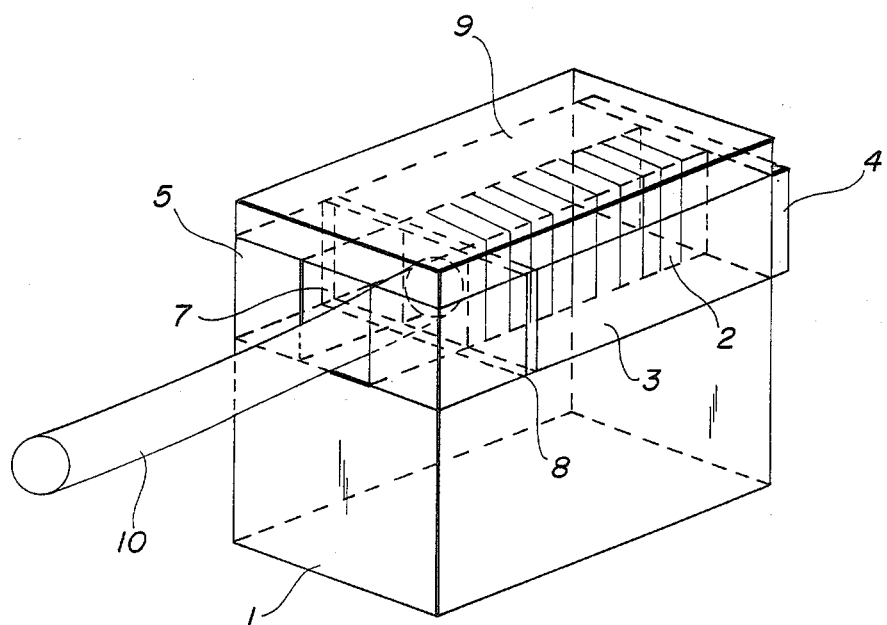
FIG. 2 is another structural model drawing of the pressure sensor of FIG. 1 after the upper clad layer is connected with the optical fiber.

FIG. 1 shows a structural model of an embodiment of a polymer optical conductor pressure sensor element whose upper clad layer is not connected to the optical fiber. FIG. 2 is a structural model of the pressure sensor element of FIG. 1 with the upper clad layer being connected with the optical fiber. The pressure sensor element comprises: a polymer optical conductor composed of a polymer substrate 1 as a lower clad layer, a core layer 2 and a lateral clad layer 3 formed over the polymer substrate 1, and an upper clad layer 9 formed over the core layer 2 and lateral clad layer 3; a filter 8 provided on the polymer optical conductor end on which the light transmitted through the optical fiber is incident; and a reflecting mirror 4 provided on the polymer optical conductor. The optical fiber 10 is connected to the pressure sensor element at the same time as the upper clad layer is cured. More specifically, the optical fiber 10 is set in an optical fiber joint groove 7 by optical fiber fixing blocks 5 and 6 formed with resists, and connected there as the upper clad layer 9 is cured. The production process of and the detection principle of the pressure sensor element of the present invention will be described in detail below.

The polymer optical conductor is manufactured by the selective photopolymerization method. Acrylic resin film (refractive index: n=1.49) such as polymethylmethacrylate (PMMA) is used as a substrate (lower clad layer). A polycarbonate solution (PcZ; n=1.59) synthesized from bisphenol Z and containing methylacrylate (MA) monomer with a low refractive index (n=1.48 when polymerized) and a light sensitizer is coated on the acrylic resin substrate. Then, methylene chloride solvent is allowed to evaporate to obtain a base film. The base film should be about 150 μm thick to allow for connection between the multi-mode optical fiber and the optical conductor. Since the MA monomer has a higher boiling point than the methylene chloride solvent, the base film contains about 20% MA monomer. Here, organic polymer films are used as the substrate film and base film. Considering that the substrate film and base film constitute the clad and core respectively, various combinations of the polymer films are permitted for use if the polymer for the clad substrate film has a lower refractive index than the polymer for the core base film and if at least one of the polymers has a refractive index which varies depending upon pressure, as photoelastic substances do. Such photoelastic substances are as follows: acrylic resin, polycarbonate, polybutadiene, polystylene, diethyleneglycol bisallyl carbonate (CR39) polymer, diallyl phthalate resin, epoxy resin, phenollic resin and silicon resin. The substrate film (clad) may be made of optical glass, quartz glass or a like inorganic material if its refractive index is lower than that of the material for the base polymer.

A high energy beam such as ultraviolet ray, X-ray, electron beam or radiation beam is irradiated on the base film through a photo mask with a core pattern (the core portion of the base film must be protected from the high energy beam radiation), so that the monomer with a low refractive index contained in the base film is partially polymerized along the pattern, to be fixed for the low refractive index in the base film. Then, the base film is allowed to dry in vacuum at about 100° C. to remove the residual monomer left unreacted from the base film portion that has not been exposed to the high energy beam radiation. Thus, optical conductor pattern which is exactly the same as the mask pattern is obtained. The optical fiber joint groove 7 is then formed in the thus obtained polymer optical conductor, and the filter 8 is provided on the optical conductor end (core end surface) to which the optical fiber 10 is to be connected, in the following procedure. First, mask resist is formed on the base polymer by using a thick film resist such as a dry film resist. Then, the portion of the base polymer corresponding to the optical fiber joint groove is etched by dry-etching process using oxygen plasma, so as to form the end plane for connection with the optical fiber. A filter of metal semipermeable membrane/multi-layered dielectric substance film/metal semipermeable membrane structure is formed on the end plane by vacuum evaporation process, so that the light with a specific wavelength range is reflected by the end plane and the light with another specific wavelength range is allowed to pass through the filter according to the Fabri-Perot interference.

Then, the optical fiber fixing blocks 5 and 6 are formed at the optical fiber joint groove 7 by the photolithography technique using thick film resists such as dry film resists. Therefore, the resists themselves are used for the optical fiber fixing blocks. Metal reflecting film of Al, Au or Ag is then formed by vacuum evaporation on the other end face of the optical conductor opposite from the end plane on which the fiber is formed. Finally, the optical fiber (multi-mode quartz optical fiber, φ125 μm) is connected to the optical conductor simultaneous with the formation of the upper clad layer 9, according to the following procedure. The optical fiber 10 is fixed to the fixing blocks 5 and 6 and set in place in the optical fiber joint groove. Acrylic resin is coated on the top surface of the optical conductor. When the acrylic resin is cured by drying, the upper clad layer formation and the optical fiber connection are achieved simultaneously. Material for the upper clad layer 9 is desirably the same as that for the substrate film. The polymer optical conductor pressure sensor in which the pressure sensor element is connected with the optical fiber is produced by the above mentioned process.

The polymer optical conductor pressure sensor thus produced in the above procedure detects pressure fluctuation in the following manner. When there is no pressure change for the sensor element, the light coming into the sensor element (the core in the polymer optical conductor) from the optical fiber 10 is transmitted through the core, with the total reflection condition satisfied at the interface between the core layer 2 and clad layer 3 due to the refractive index difference. The light is reflected by the reflecting film provided on the opposite end from the end on which light is incident, and transmitted back into the optical fiber. If there is a pressure change for the sensor element, at least either of the refractive indexes of the core layer 2 and clad layer 3 changes because at least either one of the core and clad is made of material whose refractive index varies with pressure as described earlier, (In the present example, the refractive index of the core layer 2 (PcZ) changes). As a result, the critical angel differs from that under the total reflection condition with no pressure change, as shown by the following equations:

$n_1 \sin \theta_1 = n_2 \sin \theta_2$ in which, $n_1$: Core refractive index
$n_2$: Clad refractive index
$\theta_1$: Light incident angle from core to clad
$\theta_2$: Light transmission angle in clad Here, the total reflection condition is satisfied when $\theta_2$ is 90 degrees, and $\theta_1$ corresponds to the critical angle ($\theta$th) when $\theta_2$ is 90 degrees. Accordingly, the following equation is obtained:

$$\sin \theta th = n_2/n_1$$

$$\therefore \theta th = \sin^{-1}(n_2/n_1)$$

As obvious from the above, the critical angle ($\theta$th) is a function of the refractive indexes of the core and clad layers. If at least one of the refractive indexes of the core and clad changes, therefore, the critical angle changes accordingly, causing the light loss in the optical conductor core to change. The result is a change in the intensity of light transmitted through the optical conductor core. Pressure fluctuation is thus detected based on the change in the light intensity.

During the measurement, the possible light intensity fluctuation of the light source itself may give influence to the sensor detection signal. Disturbance such as bent optical fiber may also cause light loss, affecting the sensor detection signal. To minimize these influences, the filter is provided on the polymer optical conductor (sensor element) end on which light is incident, so that the light from the light source is divided into two portions at the specified wavelength. One of the two portions is reflected by the filter to become a reference signal, and the other portion is transmitted through the polymer optical conductor to become a detection signal whose intensity changes with pressure. The signal detector (light sensor) receives the transmitted light (detection signal) and the reflected light (reference signal) through a filter having the same characteristic as the filter on the light incident plane of the optical conductor. Therefore, the sensor output is the ratio of the detection signal to the reference signal. Accurate pressure measurement can be thus obtained because the detection signal-to-reference signal ratio varies solely depending upon the pressure applied to the sensor element and is not susceptible to the light intensity fluctuation of the light source itself or by external disturbance.

As described above in detail, the pressure sensor of the present invention provides extremely useful advantages as follows:

(1) According to the present invention, the sensor element and the optical signal transmitting fiber are made of insulating material, and the pressure fluctuation is detected by optical system without using electrical means in the sensor element. Therefore, the pressure sensor of the present invention provides high electromagnetic induction resistance and good environment resistance.

(2) Since the sensor element of the present invention is composed of the polymer optical conductor, a sensor element of thin film or small construction can be manufactured. In addition, it is possible to apply the sensor element to a touch sensor. Besides, the sensor element provides potentiality for a thinner or more highly integrated construction.

(3) Though the sensor of the present invention detects light intensity fluctuation, it does not involve a polarizer, an analyzer, a polarized beam splitter, a $\lambda/4$ wavelength plate and a rod lens which are usually required by a light intensity detector sensor, or particularly by a sensor which detects light intensity using the plane of polarization of light. Accordingly, the number of optical components involved can be substantially reduced.

(4) Since the sensor output is the differential between the detection signal and the reference signal, the signal output is not affected by the light intensity fluctuation of the light source itself or by the light source fluctuation caused by disturbance of the optical fiber. Therefore, highly accurate measurement can be achieved constantly.

(5) Since the optical fiber for signal transmission to the sensor element is of multi-mode type, low loss connection of the optical fiber to the sensor element is relatively easy. Besides, manufacturing process is simple, because the optical fiber connection is achieved simultaneously as the upper clad layer formation.

(6) Since the sensor element is produced by selective optical polymerization and photolithography techniques, the element can be batch-processed and compatible.

(7) Due to the small or thin film construction and batch processing of the sensor element as well as the reduction in the number of required optical components, the sensor element can be manufactured at an extremely low cost.

As mentioned above, the optical conductor pressure sensor of the present invention can measure pressure fluctuation easily and with high accuracy under various environmental conditions, and the production cost thereof is very low.

While only certain embodiments of the present invention have been described, it will be apparent to those skilled in the art that various changes and modifications may be made therein without departing from the spirit and scope of the present invention as claimed.

What is claimed is:

1. A pressure sensor comprising a polymer optical conductor which comprises:

a substrate;

a first organic polymer film, formed on the substrate, having a core layer and lateral clad members on either side of said layer, the refractive index of said film in said lateral clad members being substantially the same as that of the substrate;

a second organic polymer film superposed on said first organic polymer film, the refractive index of said second organic polymer film being substantially the same as that of said lateral clad members of said first organic polymer film ; and an optical reflecting film provided on an end face of said first organic polymer film at a portion corresponding to said core layer;

wherein at least one of the refractive indices of said first and second organic polymer films changes with pressure.

2. The pressure sensor as claimed in claim 1, wherein the pressure sensor is provided with an optical fiber joint groove for optically connecting an optical fiber end to a patterned portion of said first organic polymer film at said core layer on the end where the reflecting film is not formed.

3. The pressure sensor as claimed in claim 2, wherein an optical filter is provided on said patterned portion of said first organic polymer film on the end where the reflecting film is not formed, the optical filter dividing the incident light into a first portion whose wavelength is longer than a specified wavelength and a second portion whose wavelength is shorter than the specified wavelength, one of the two light portions being allowed to pass through the filter, the other being reflected by the filter.

4. The pressure sensor as claimed in claim 1, wherein an optical filter is provided on a patterned portion of said first organic polymer film on the end where the reflecting film is not formed, the optical filter dividing the incident light into a first portion whose wavelength is longer than a specified wavelength and a second portion whose wavelength is shorter than the specified wavelength, one of the two light portions being allowed to pass through the filter, the other being reflected by the filter.

5. The pressure sensor as claimed in claim 1, wherein the substrate is made of organic polymer film, optical glass or quartz glass.

6. An optical pressure sensor, comprising:
a substrate;
a first composite layer, comprising,
a core layer disposed on said substrate and having a refractive index greater than a refractive index of said substrate, and
lateral cladding layers disposed on said substrate, each lateral cladding layer being at position lateral to said core layer and having refractive index less than said core layer;
an upper clad layer disposed above said core layer and said lateral cladding layers and having a refractive index substantially equal to the refractive index of said lateral cladding layers; and
an optical reflecting film disposed at a first end face of said core layer,
wherein at least one of the refractive indices of said core layer and said upper clad layer varies with pressure.

7. The optical pressure sensor of claim 6, wherein said first composite layer comrpises a first organic polymer film and said upper clad layer comprises a second organic polymer film.

8. The pressure sensor as claimed in claim 7, wherein the substrate is made of organic polymer film, optical glass or quartz glass.

9. The optical pressure sensor of claim 6 further comprising:
an optical fiber joint groove, and
an otical fiber disposed in said optical fiber joint groove and optically connected to said core layer at a second end face of said core layer opposite to said first end face.

10. The optical pressure sensor of claim 9, wherein an optical filter is provided at said second end face of said core layer between said optical fiber and said core layer, wherein said optical filter divides incident light into a first portion whose wavelength is longer than a specified wavelength and a second portion whose wavelength is shorter than the specified wavelength, one of the two light portions being allowed to pass through the filter, the other being reflected by the filter.

11. The optical pressure sensor of claim 9, wherein said first composite layer comprises a first organic polymer film and said upper clad layer comprises a second organic polymer film.

12. The pressure sensor as claimed in claim 11, wherein the substrate is made of organic polymer film, optical glass or quartz glass.

13. The optical pressure sensor of claim 12, wherein said upper clad layer end said lateral cladding layers are composed of the same material.

14. The optical pressure sensor of claim 13, wherein an optical filter is provided at said second end face of said core layer between said optical fiber and said core layer, wherein said optical filter divides incident light into a first portion whose wavelength is longer than a specified wavelength and a second portion whose wavelength is shorter than the specified wavelength, one of the two light portions being allowed to pass through the filter, the other being reflected by the filter.

15. The optical pressure sensor of claim 14, wherein the layer having a refractive index that varies with pressure is composed of a photoelastic substance selected from the group consisting of acrylic resin, polycarbonate, polybutadiene, polystylene, diethylenglycol bis-allyl carbonate polymer, diallyl phthalate resin, epoxy resin, phenolic resin and silicon resin.

16. The optical pressure sensor of claim 6, wherein the layer having a refractive index that varies with pressure is composed of a photoelastic substance selected from the group consisting of acrylic resin, polycarbonate, polybutadiene, polystylene, diethylenglycol bis-allyl carbonate polymer, diallyl phthalate resin, epoxy resin, phenolic resin and silicon resin.

17. The optical pressure sensor of claim 6, wherein said upper clad layer end said lateral cladding layers are composed of the same material.

* * * * *